(No Model.)
S. HUNTER & S. N. LOGAN.
THILL COUPLING.
No. 551,315.          Patented Dec. 10, 1895.
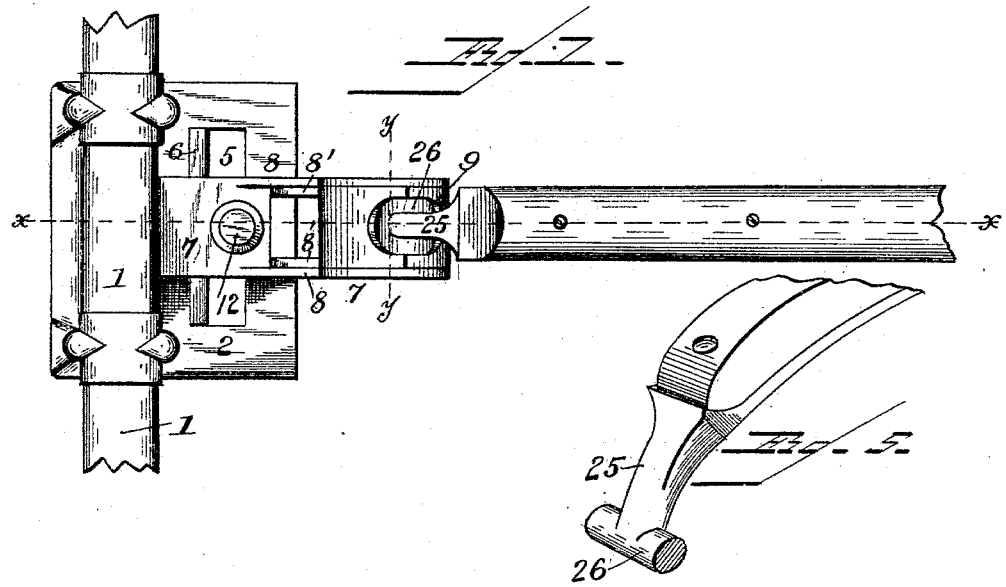
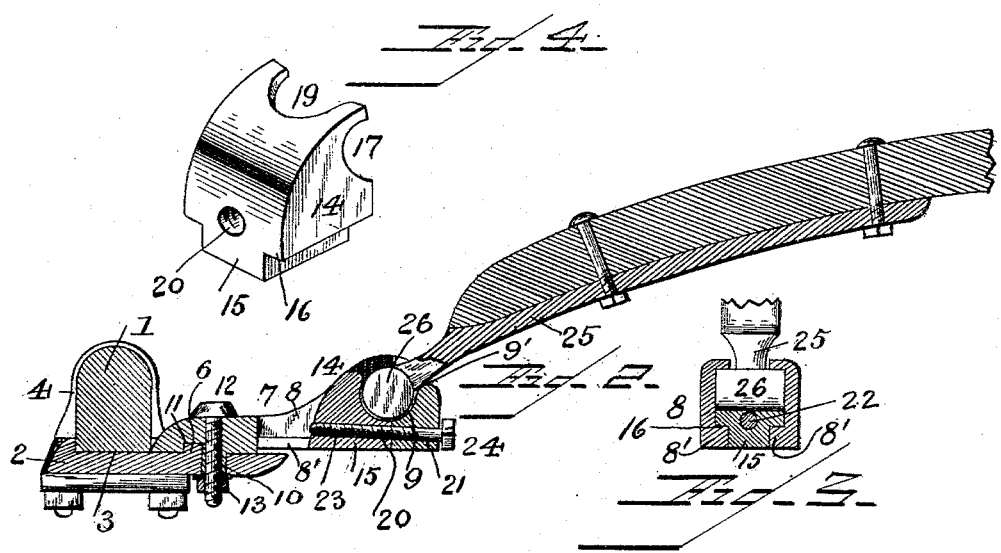
WITNESSES
INVENTOR
Samuel Hunter
Samuel N. Logan,
By H. D. Willson, Attorney

UNITED STATES PATENT OFFICE.

SAMUEL HUNTER AND SAMUEL N. LOGAN, OF LEECHBURG, PENNSYLVANIA.

THILL-COUPLING.

SPECIFICATION forming part of Letters Patent No. 551,315, dated December 10, 1895.

Application filed March 12, 1895. Serial No. 541,403. (No model.)

*To all whom it may concern:*

Be it known that we, SAMUEL HUNTER and SAMUEL N. LOGAN, citizens of the United States, residing at Leechburg, in the county of Armstrong and State of Pennsylvania, have invented certain new and useful Improvements in Thill-Couplings; and we do declare the following to be a full, clear, and exact description of the invention, such as will enable others skilled in the art to which it appertains to make and use the same.

Our invention relates to thill-couplings of the antirattler type.

The object of our invention is to provide a thill-coupling which shall be capable of adjustment to compensate for the wear of the parts; furthermore, which may be adjusted to accommodate the thills of different widths, and, finally, to provide a thill-coupling which shall be simple of construction, durable in use, and comparatively inexpensive of production.

With these objects in view, the invention consists in certain features of construction and combination of parts which will be hereinafter fully described and claimed.

In the accompanying drawings, Figure 1 is a top plan view of our improved thill-coupling. Fig. 2 is a longitudinal vertical sectional view on line $x\ x$, Fig. 1. Fig. 3 is a transverse sectional view on line $y\ y$, Fig. 1. Fig. 4 is a detail perspective view of the clamping-block. Fig. 5 is a detail perspective of the thill-iron.

1 denotes the axle of a vehicle.

2 denotes a plate having a recess 3 which fits the under side of the axle and 4 denotes the clips for securing the plate to the axle. The plate 2 has a transverse opening 5, at the rear of which is a transverse rib 6, for purposes hereinafter explained.

7 denotes the coupling-head having the parallel sides 8 provided with longitudinal guide-ribs 8', the curved seat 9 at the forward ends of the sides, a depending rib 10 on the under side near the rear end of the head to take into the transverse opening 5 and a groove 11 at the rear of the rib to receive the transverse rib 6. A bolt 12 passes through the head and the opening 5 of the plate and is provided with a nut 13, by means of which the said head is securely fastened to the plate in the desired lateral adjustment.

14 denotes the sliding block which is provided with a tenon 15, which projects down between the sides of the head and with shoulders 16, which engage the guide-ribs 8' and slide thereon. The forward face of the block is provided with a transverse seat 17 and a curved recess 19, corresponding to the curved seat 9 and the curved recess 9'. The block is provided with a screw-threaded aperture 20, which registers with a plain aperture 21 in the forward end of the head, and passed through these apertures is a rod 22, the rear end of which is threaded as shown at 23 to engage the threads of the aperture 20, and the forward end of which is provided with a head 24, by means of which it may be worked.

25 denotes the thill-iron provided with laterally-extending lugs 26, which fit in the seats of the head and the block, while its rounded shank portion is adapted to freely swing in the curved recesses 9' and 17. By drawing the block tightly against the lugs, the thill-iron will be securely coupled to the head and the objectionable rattling of the parts overcome. When the seats or lugs become worn the block may be moved farther forward, to compensate for the wear and if desired, the seats of the block and head may be provided with an elastic packing-block, such for instance as rubber, felt, or analogous material. The head is firmly secured to the plate by the bolt 12 and made laterally adjustable therewith to accommodate shafts of different widths.

Having thus described our invention, we claim and desire to secure by Letters Patent of the United States—

1. The combination of a plate to be secured to the axle of a vehicle and provided with a transverse opening and a rib at one side of the opening, a coupling head having a depending transverse rib to fit the opening and a transverse groove to take the rib of the plate, a bolt and nut for securing the head to the plate, a thill iron, and means for securing the thill iron to the head, substantially as set forth.

2. The combination of a plate adapted to be clipped to the axle of a vehicle, said plate being provided with a transverse rib and opening, a coupling head being provided with a transverse groove and rib to engage respectively the aforesaid rib and opening, a bolt and nut for securing the head to the plate in desired lateral adjustment, the said head provided with guide ribs on its sides, a seat, a curved recess, and a plain opening, a block provided with shoulders to slide on said guide ribs with a tenon to fit therebetween with a corresponding seat and curved recess and with a screw threaded aperture registering with the plain aperture, a thill iron having lugs adapted to said seats, and a rod having plain and screw threaded portions to engage the plain and screw threaded apertures aforesaid, substantially as set forth.

In testimony whereof we affix our signatures in presence of two witnesses.

SAMUEL HUNTER.
SAMUEL N. LOGAN.

Witnesses:
SAML. N. DRURY,
A. B. SUIT.